Nov. 11, 1969   W. E. SCHILLINGER   3,478,328
CONTINUOUS AVERAGING SYSTEM
Original Filed Dec. 27, 1965   3 Sheets-Sheet 1

INVENTOR
WALTER E. SCHILLINGER

BY
ATTORNEY

United States Patent Office 3,478,328
Patented Nov. 11, 1969

3,478,328
CONTINUOUS AVERAGING SYSTEM
Walter E. Schillinger, Brooklyn, N.Y., assignor to International Business Machines Corporation, Armonk, N.Y., a corporation of New York
Continuation of application Ser. No. 516,387, Dec. 27, 1965. This application July 5, 1968, Ser. No. 746,697
Int. Cl. G11b *13/00;* G06f *1/00*
U.S. Cl. 340—172.5                     6 Claims

ABSTRACT OF THE DISCLOSURE

A system for performing continuous averaging on the point or points of a continuously generated waveform. The system makes use of the relationship $$A_n = A_{n-1} + \frac{1}{n}(S_n - A_{n-1})$$

where $A_n$ is the average value for the first $n$ samples on a given point of the waveform and $S_n$ is the value of the $n$th sample of the point. The system includes storage means for storing the value $A_{n-1}$, a subtracter for performing the operations $S_n - A_{n-1}$, a divider for dividing the output of the subtracter by $n$ and finally an adder for adding the output of the divider to the currently stored $A_{n-1}$ in the storage means. The output of the adder is returned to the storage means upon the termination of the operation.

---

The present application is a continuation of application Ser. No. 516,387 of Walter E. Schillinger filed Dec. 27, 1965, entitled "Continuous Averaging System," now abandoned.

This invention relates to continuous averaging systems, and more particularly to a continuous averaging system which has minimum data storage requirements.

There are many areas of data acquisition measurement and analysis where weak, repetitive signals must be extracted from backgrounds of non-filterable, random electrical noise. One method of accomplishing this is to digitally average the recurrent signals. The standard method of performing digital or continuous averaging on a recurrent signal is to repetitively sweep the signal, store the sum of the samples of each point on the sweep, and, where an actual average value for a point on the wave form is required, divide the stored value for that point by the number of sweeps. When this is done, the value stored for the signals grows with the number of sweeps, whereas the noise, being random, increases as the square root of the number of sweeps. Hence, the signal-to-noise ratio is enhanced as the square root of the number of sweeps.

The digital averaging technique described above was recently used in the detection of radar echos from the planet Venus. In addition to applications in radar astronomy, the digital averaging technique may also find applications in such physical sciences as magnetic resonance measurements, vibration studies, optical spectroscopy, oceanography, geophysics, and Mossbauer effect measurements. The continuous averaging technique is also valuable in various biomedical applications, including electroencephalography for averaging evoke response signals in the brain; electrophysiology for time interval averaging measurements of nerve action responses along the nerve paths, spinal cord or portions of the brain; electrocardiography for studies of events related to the cardiac cycle; and various digitizing applications where fast signal responses are obscured by random electrical noise several times greater in magnitude than the signal of interest.

While the standard continuous averaging technique gives satisfactory results, it suffers from a variety of shortcomings. The primary problem with the standard averaging technique is that, as the number of sweeps increases, the value of the stored sums for each point on the waveform become quite large. In order to prevent memory overflow, large capacity memories are required. Since large, high-speed memories are extremely expensive, the standard continuous averaging technique requires the circuit designed to effect a compromise between system cost and system access time. Another shortcoming of existing continuous averaging techniques is that the value stored for each sample point on the waveform being scanned is the sum of the samples taken on that point during the various sweeps. Any time the average value for a given point is desired, the additional computation of dividing the stored sum by the number of sweeps must be performed. Other features which an optimum continuous averaging technique should possess, but which are unavailable with existing averaging techniques include the ability to obtain accurate results even if all points on the waveform are not sampled the same number of times and a self-correcting capability in the system to compensate for errors in any given sample or in the computations related thereto.

It is therefore a primary object of this invention to provide an improved digital or continuous averaging system and technique.

A more specific object of this invention is to provide a continuous averaging system which does not require large capacity memory devices.

Another object of this invention is to provide a continuous averaging system which is capable of supplying the average value of a point on the curve without requiring additional computations to be performed.

A further object of this invention is to provide a continuous averaging system which is capable of giving accurate results even if each point on the waveform being sampled is not sampled the same number of times.

A further object of this invention is to provide a system of the type described above which has self-correcting capabilities and is, therefore, capable of compensating for errors in any given sample or in the computations related thereto.

In accordance with these objects, this invention provides a continuous averaging system which stores, for each point on the waveform being investigated, an average value determined for that point. When a new sample is applied to the system, a determination is made as to the increment of change which the new sample causes in the stored average value for the sampled point. This is accomplished by finding the difference between the stored average value and the value of the new sample and then dividing this difference by the number of sweeps. This increment of change is algebraically added to the stored average value and the new average value, determined in this way, is written into the average value storing device in place of the previous value stored therein for the point sampled.

It is therefore a feature of this invention to store only the average value determined for each point on the waveform thereby substantially reducing the storage requirements on the system.

Another feature of the invention is the changing of the average value by a small increment in response to each new sample, whereby the loss of any given sample causes a negligible effect on the final average obtained.

The foregoing and other objects, features and advantages of the invention will be apparent from the following more particular description of a preferred embodiment of the invention, as illustrated in the accompanying drawings.

Figure 2:
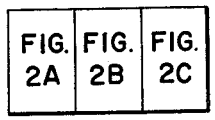
FIG. 2 is a diagram illustrating how
Figure 2A:
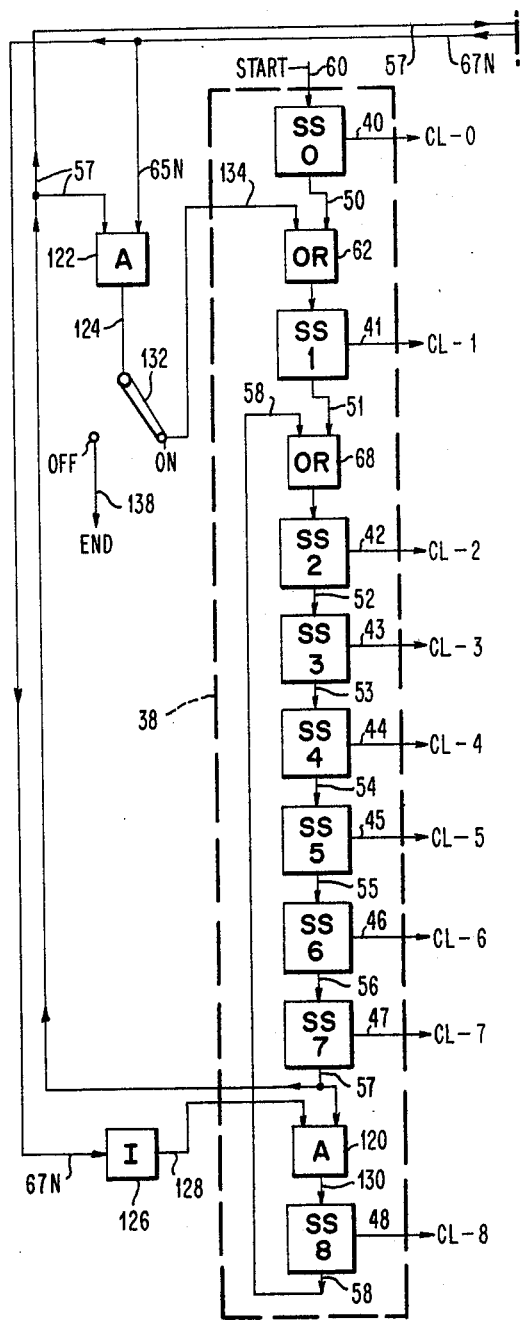
FIGS. 2A–2C are combined to form a schematic block diagram of a preferred embodiment of the system of this invention.
Figure 2B:
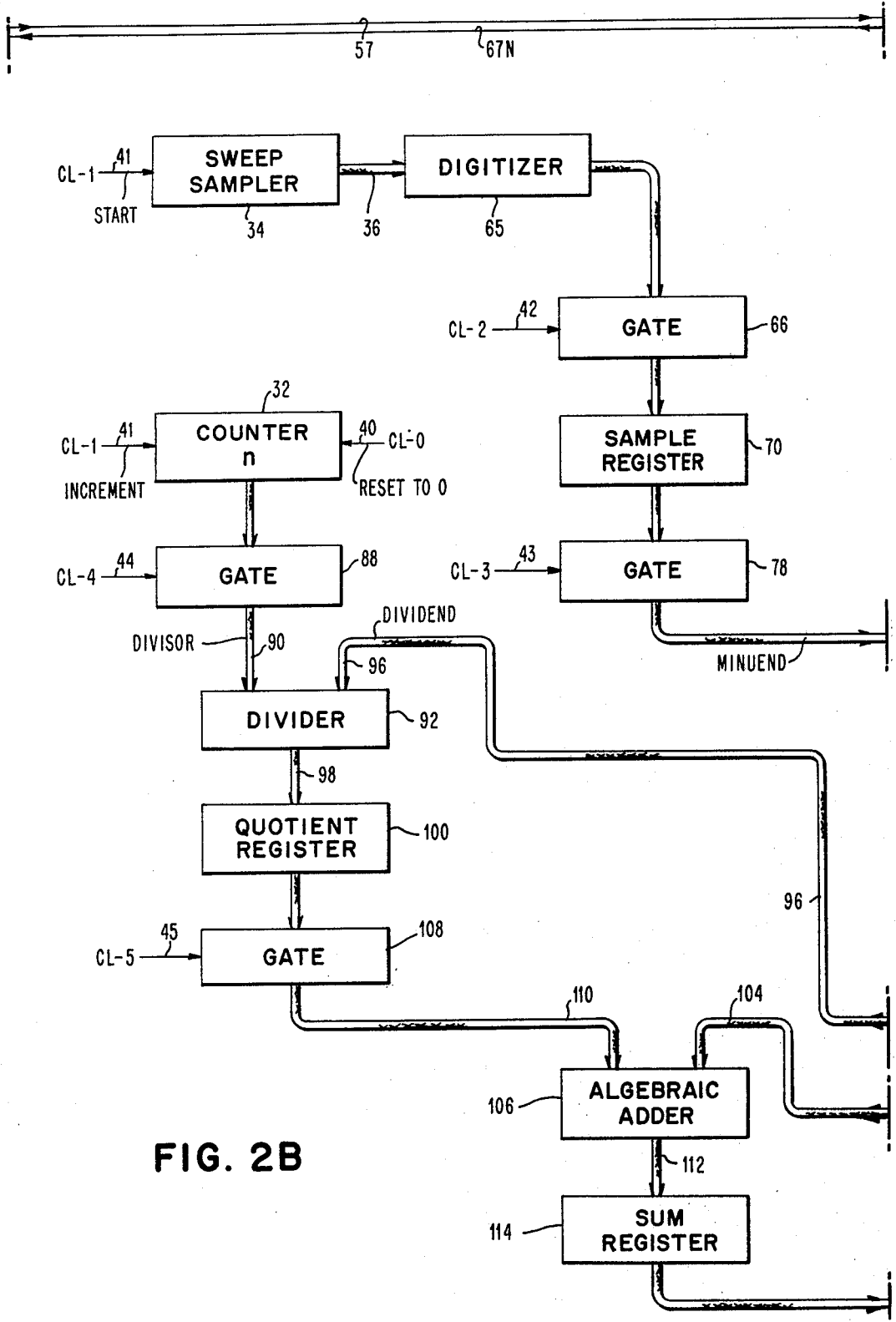
Figure 2C:
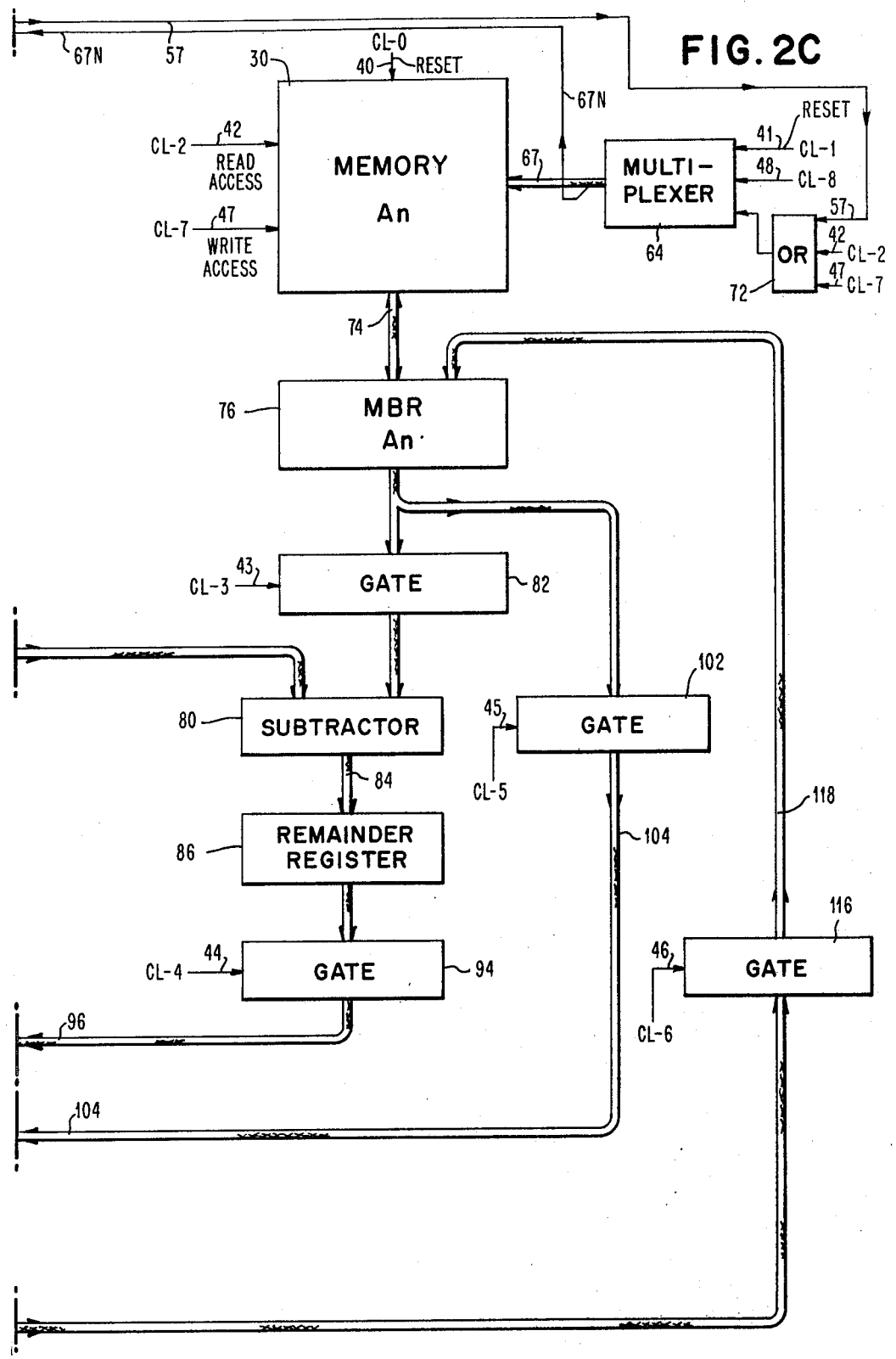

FIGS. 2A–2C, when combined, form a schematic block diagram of a preferred embodiment of the system of this invention.

Figure 1:
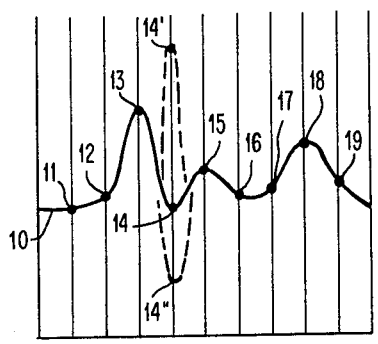
FIG. 1 is a diagram of a waveform which is used to illustrate the operation of the system of this invention.

Referring now to FIG. 1, it is seen that the waveform 10 shown therein is sampled at a plurality of points 11–19. It is assumed that waveform 10 is, for example, repetitively generated so that a fairly large number of sweeps may be performed on it. When this is done, the average value for samples on the signal will remain constant whereas noise, due to its random nature, tends to be positive and negative, over a large number of sweeps, with about equal frequency (for example, the noise pulses taken during the samples 14′ and 14″ shown in FIG. 1), and will therefore effectively cancel itself out in the computation of the average.

As has been previously indicated, existing continuous averaging techniques suffer from a variety of shortcomings. This invention overcomes these shortcomings by recognizing and utilizing the following relationship:

$$A_n = A_{n-1} + \frac{1}{n}(S_n - A_{n-1}) \qquad (1)$$

where $$A_n = \frac{1}{n}(S_1 + S_2 + \ldots + S_n)$$

is the average value of the first $n$ samples on a given point of the waveform and $S_n$ is the value of the $n$th sample of the point.

It is seen that by using the relationship of Equation 1 to perform continuous averaging, only the average value for each point on the waveform being sampled, and the number of sweeps, need be stored. Since the average value for each of the sampled points should remain fairly constant, regardless of the number of sweeps, relatively inexpensive, low-capacity high-speed memory may be utilized to store these quantities. Also, quantitive results are immediately available from high speed memory without requiring any additional computations to be performed. The potential problem of memory overflow is also eliminated.

From Equation 1, it is seen that the amount algebraically added to the stored average value as a result of each sample is equal to the quotient of the difference between the stored average value and the value of the sample, divided by the number of sweeps. If a fairly large number of sweeps are employed, this quantity becomes extremely small. Under these conditions, a negligible error is introduced into the system if each point on the waveform is not sampled and counted the same number of times as each other point. The system also has certain self-correcting capabilities. If, for example, due to an error in division or in the reading of a sample, the amount added to the average as a result of a given sample is less than it should be, the resulting average will be smaller than the true value and the next sample will cause more to be added to the stored average value than would otherwise be the case.

CIRCUIT DESCRIPTION

FIGS. 2A–2C show a continuous averaging system which operates in accordance with the relationships of Equation 1. Referring first to FIG. 2C, it is seen that the system includes a memory 30 in which the average value determined so far for each of the points 11–19 (FIG. 1) on the waveform being analyzed is stored. The system also includes a counter 32 (FIG. 2B) for recording the number of sweeps, and a sweep-sampler circuit 34 which, when started, sweeps across the waveform 10 sampling the points 11–19 in succession, and generates an output signal on line 36 the amplitude of which is proportional to the magnitude of the waveform at the point being sampled. The system is controlled by a clock 38 (FIG. 2A) which is made up of a plurality of single-shots designated SS0–SS8. The single shots SS0–SS8 generate output signal on lines 40–48 respectively, when they are in their ON state and generate output signals on lines 50–58 respectively when they switch from their ON to their OFF states (i.e., time out). The lines 40–48 are also designated lines CL0–CL8 respectively. In order to simplify the drawings, no attempt has been made to connect the lines 40–48 to the various points in the circuit where they are utilized. Instead, at each of these points, a line appears with the proper letter and number designations.

The operation of the system shown in FIGS. 2A–2C is initiated by applying a start signal through line 60 to set single shot SS0 to its ON state. The resulting output signal on CL0 line 40 is applied to reset the contents of average value ($An$) memory 30 (FIG. 2C) to all 0's. The signal on line 40 is also applied to reset sweep counter 32 (FIG. 2B) to a count of zero. When single shot SS0 times out, the resulting output signal on line 50 is applied through OR gate 62 to set single-shot SS1 to its ON state. When single shot SS1 is in its ON state, the resulting output signal on line 41 is applied to start sweep-sampler 34 to perform a first sweep of waveform 10 (FIG. 1); to increment sweep counter 32 to a count of 1 indicating that the first sweep is being performed; and to reset multiplexer 64 (FIG. 2C) to its first position. Multiplexer 64 controls the address position in memory 30 which is accessed at any given time. The starting of sweep sampler 34 causes point 11 (FIG. 1) of the waveform to be sampled and a voltage representative of the value thereof to be applied through lines 36 to digitizer 65. The output from digitizer 65, which is the digitized value of the sample taken on point 11, is applied as the information input to gates 66.

When single shot SS1 times out, the resulting output signal on line 51 is applied through OR gate 68 to set single-shot SS2 to its ON state. When single shot SS2 is in its ON state, the resulting output signal on line 42 is applied to condition gates 66 (FIG. 2B) to apply the sample value from digitizer 65 to sample register 70. The signal on line 42 is also applied to the read-access input of memory 30 and through OR gate 72 (FIG. 2C) and multiplexer 64 to the address input for the first address position in memory 30. This results in the contents of the first memory position in memory 30 being read out through lines 74 into memory buffer register (MBR) 76. The $A_{n-1}$ value of Equation 1 is in this manner read into MBR 76. Since memory 30 was reset to 0 by the signal on line 40 at CL0 time, for the first sweep of waveform 10, the values read into MBR at CL2 time will all be 0.

When single-shot SS2 times out, the resulting output signal on line 52 is applied to set single-shot SS3 to its ON state. When single-shot SS3 is in its ON state, the resulting output signal on line 43 is applied to condition gates 78 (FIG. 2B) to apply the $S_n$ information stored in register 70 to the minuend input of subtractor 80 and to condition gates 82 to apply the $A_{n-1}$ data stored in MBR 76 to the subtrahend input of subtractor 80. The quantity $(S_n - A_{n-1})$ on output lines 84 from subtractor 80 is stored in remainder register 86. When single shot SS3 times out, the resulting output signal on line 53 is applied to set single-shot SS4 to its ON state. When single-shot SS4 is in its ON state, the resulting output signal on line 44 is applied to condition gates 88 (FIG. 2B) to apply the sweep count in counter 32 through lines 90 to the divisor input of divider 92 and to condition gates 94 (FIG. 2C) to apply the quantity in remainder register 86 through lines 96 to the dividend input of the divider. The quantity on output line 98 from divider 92, which quantity is the second term on the right-hand side of Equation 1, is stored in quotient register 100.

When single-shot SS4 times out, the resulting output signal on line 54 is applied to switch single-shot SS5 to its ON state. When single-shot SS5 is in its ON state, the resulting output signal on line 45 is applied to condition gates 102 (FIG. 2C) to pass the $A_{n-1}$ quantity in MBR 76 through lines 104 to one input of algebraic adder 106. The first term on the right hand side of Equation 1 is in this way applied to adder 106. The signal on line 45 is also applied to condition gates 108 to apply the second term on the right hand side of Equation 1, which is stored in quotient register 100, through lines 110 to the other input of algebraic adder 106. The quantity on output lines 112 of adder 106, which quantity is equal to $A_n$, is stored in sum register 114.

From the above, it is seen that when single-shot SS5 times out generating an output signal on line 55, the quantity stored in sum register 114 is the new average value for the point being looked at (for the first sample, this would be the value of the sample just looked at). The signal on line 55 is applied to set single-shot SS6 to its ON state. When single-shot SS6 is in its ON state, the resulting output signal on line 46 is applied to condition gates 116 (FIG. 2C) to pass the $A_n$ value in sum register 114 through lines 118 to MBR 76. When single-shot SS6 times out, the resulting output signal on 56 is applied to set single-shot SS7 to its ON state. When single-shot SS7 is in its ON state, the resulting output signal on line 47 is applied to the write-access input of memory 30 and is also applied through OR gate 72 and multiplexer 64, to the proper one of the address inputs 67 for memory 30. The combined occurrence of these inputs to memory 30 causes the new $A_n$ value stored in MBR 76 to be written into memory 30 at the address position indicated by multiplexer 64, in this case at the address position corresponding to the point 11 (FIG. 1) on waveform 10.

When single-shot SS7 times out, a single cycle of operation for a point on waveform 10 has been completed and two decisions have to be made. The first decision is whether all points on the waveform have been investigated for the sweep being performed and the second decision is whether, if all points have been investigated, a new start signal should be applied to sweep-sampler 34 to cause a new sweep to be initiated. The first of these decisions is effected by applying the signal on output line 57 from single-shot SS7 as one input to AND gates 120 and 122. The other input to AND gate 122 is output line 67n from multiplexer 64. A signal appears on line 67n when the multiplexer has been stepped to its last position (i.e., the position corresponding to point 19 on the curve of FIG. 1) and an input is applied to OR gate 72. It is noted that the signal on line 57 is also applied as one input to OR gate 72 so that, if the last point on the waveform is the one being looked at, AND gate 122 is fully conditioned to generate an output signal on line 124. However, for the scan presently being considered, the multiplexer is in its first position and there is therefore, no signal on line 67n. Under these conditions inverter 126 is generating an output signal on line 128 which signal is applied to fully conditioned AND gate 120 to apply a signal through line 130 to set single-shot SS8 to its ON state. When single-shot SS8 is in its ON state, the resulting output signal on line 48 is applied to increment multiplexer 64 to its next position. For the example being discussed, this means that multiplexer 64 would be advanced to its second position (i.e., the position corresponding to point 12 shown in FIG. 1). When single-shot SS8 times out, the resulting output signal on line 58 is applied through OR gate 68 to set single-shot SS2 to its ON state.

Clock 38 and sweep-sampler 34 are synchronized such that, just prior to each time that single-shot SS2 is set to its ON state, the sweep sampler has advanced to the next point to be looked at on waveform 10 (FIG. 1). Therefore, at this time, point 12 is being sampled and a digitized value representing the magnitude thereof is applied to the information input of gates 66. The system then precedes through clock times CL2–CL8 in a manner identical to that previously described for the first sampling interval. This sequence of operations is repeated for each sample point 12–18 on the curve of FIG. 1. At CL8 time when point 18 is being sampled, the increment signal applied to multiplexer 64 increments the multiplexer to its $n$ position. A signal is then applied through line 58 and OR gate 68 to again set single-shot SS2 to its ON state.

The system then precedes through clock times CL2–CL7 in a manner identical to that previously described. However, since there is now a signal on output line 67n from multiplexer 64 when single-shot SS7 times out, the signal on line 57 finds AND gate 122 conditioned, causing an output signal on line 124 which is applied to switch 132. It is assumed that more sweeps are desired and switch 132 is therefore set to its ON position. The signal on line 124 is therefore passed through switch 132, line 134 and OR gate 62 to set single-shot SS1 to its ON state. When single-shot SS1 is in its ON state, a signal is again applied to increment counter 32 to a count of 2 indicating that a second sweep is now being performed on the waveform, a signal is applied to start sweep-sampler 34 causing a second sweep to be performed, and a signal is applied to reset multiplexer 64 to its first position. The system is now ready to perform a second sweep. When single shot SS1 times out, the resulting output signal on line 51 is therefore applied through OR gate 68 to set single-shot SS2 to its ON state. The system then proceeds through a second sweep of the points of waveform 10 in a manner identical to that described for the first sweep, the only difference being that the average values now read out from memory 30 into MBR 76 are non-zero.

At the end of the second sweep, and at the end of each sweep thereafter, when single-shot SS7 times out and point 19 is being sampled, AND gate 122 is fully conditioned to pass a signal through line 124, switch 132, line 134 and OR gate 62 to set single-shot SS1 to its ON state causing a new sweep to be initiated. This sequence of operation continues until it is determined that the desired number of sweeps have been performed. When this occurs, switch 32 is switched to its OFF position. When the switch is moved to its OFF position and the sweep being performed is completed, the signal on line 124 is applied through switch 132 and line 138 to a suitable device to indicate the end of the operation. Since the signal on line 138 causes none of the single-shots in clock 38 to be set to its ON state, no further operations can be performed. The average values stored in memory 30 may then be read out and utilized in any desired manner.

While a manual switch 132 has been used to control the number of sweeps to be performed, this operation may easily be automated by detecting the count in counter $n$, permitting a signal to pass through line 124 to line 134 when a count less than some predetermined value is in this counter, and gating the signal on line 124 to line 138 when the count in counter $n$ reaches the predetermined value. Conversely, a manual restart button or switch may be substituted for the automatic sweep-restart mechanism shown in FIGS. 2A–2C. It is also apparent that digitizer 65 could be dispensed with and analog rather than digital elements used to perform the various functions of the circuit in FIGS. 2A–2C.

While in the preferred embodiment of the invention, a plurality of points on a waveform have been analyzed, there are some applications where only a single point is repetitively sampled. Where this is the case, memory 30, multiplexer 64, and the related circuitry may be dispensed with, and the single $A_n$ value which is required may be stored directly in MBR 76. Clock 38 could also be simplified somewhat under these conditions.

If a binary system is employed, divider 92 may be simplified by permitting the division to be accomplished by shifting to the right. Since the system is self-correcting, a high degree of accuracy in the divider is not required and an adequate approximation might be to, for example, shift $m$ places for values of $n$ between $3/2\ 2^{m-1}$ and $3/2\ 2^m$.

While the invention has been particularly shown and described with reference to a preferred embodiment there-

What is claimed is:

1. A continuous averaging system comprising:
means for storing an average value determined for the quantity being averaged;
means for applying a new sample of the quantity being averaged to said system;
means for determining the increment of change in the stored average value caused by said new sample;
means for algebraically adding said increment of change to said stored average value;
and means for replacing the value in said average value storing means with the output from said adding means.

2. A system of the type described in claim 1 including means for storing the number of samples taken on the quantity being averaged;
wherein said increment determining means includes means for determining the difference between said stored average value and said new sample;
and means for dividing said difference by the number of samples.

3. A system of the type described in claim 1 wherein said quantity being averaged is a waveform which is sampled at a plurality of points during each sampling cycle;
wherein said average value storing means stores a separate value for each of said points on said waveform;
and including means for accessing said average value storing means in a manner such that the average value used for each computation is for the same point as said new sample.

4. A continuous averaging system comprising:
means for storing a previously determined average value for the quantity being averaged;
means for applying a new sample of the quantity being averaged to said system;
and means for using said new sample to compute a new average value by use of the relationship;

$$A_n = A_{n-1} + \frac{1}{n}(S_n - A_{n-1})$$

where $A_n$ is the average value of the first $n$ samples on the quantity and $S_n$ is the value of the $n$th sample;
wherein said last named means includes a subtracter, a divider, an adder and means for gating the new average value $A_n$ to the storage means operable in the recited order to compute said new average value.

5. A continuous averaging system comprising:
means for storing an average value determined for the quantity being averaged;
means for applying a new sample of the quantity being averaged to said system;
means for determining an increment of change in the stored average value representative of said new sample;
means for algebraically adding said determined increment of change to said stored average value;
and means for replacing the value in said average value storing means with the output from said adding means.

6. A continuous averaging system comprising:
means for storing an average value determined for the quantity being averaged;
means for applying a new sample of the quantity being averaged to said system;
means for determining the approximate increment of change in the stored average value caused by said new sample;
means for algebraically adding said approximate increment of change to said stored average value;
and means for replacing the value in said average value storing means with the output from said adding means.

References Cited

UNITED STATES PATENTS

| | | | |
|---|---|---|---|
| 3,182,181 | 5/1965 | Schumann | 235—150.51 X |
| 3,197,621 | 7/1965 | Urguhart | 340—172.5 X |
| 3,317,717 | 5/1967 | Schumann | 235—150.5 X |
| 3,373,273 | 3/1968 | Schubert | 235—150.53 X |
| 3,378,676 | 4/1968 | Clement | 235—151.3 |

PAUL J. HENON, Primary Examiner

U.S. Cl. X.R.

235—150.5, 151.3, 181, 183